(12) United States Patent
Hilgers (10) Patent No.: US 7,764,240 B2
(45) Date of Patent: Jul. 27, 2010

(54) ANTENNA CONFIGURATION FOR RFID TAGS

(75) Inventor: Achim Hilgers, Alsdorf (DE)

(73) Assignee: NXP B.V., Eindhoven (NL)

( * ) Notice: Subject to any disclaimer, the term of this patent is extended or adjusted under 35 U.S.C. 154(b) by 564 days.

(21) Appl. No.: 10/591,543

(22) PCT Filed: Mar. 2, 2005

(86) PCT No.: PCT/IB2005/050764

§ 371 (c)(1),
(2), (4) Date: Aug. 13, 2007

(87) PCT Pub. No.: WO2005/088770

PCT Pub. Date: Sep. 22, 2005

(65) Prior Publication Data

US 2008/0284666 A1    Nov. 20, 2008

(30) Foreign Application Priority Data

Mar. 5, 2004    (EP) .................................. 04100904

(51) Int. Cl.
*H01Q 11/06* (2006.01)
*H01Q 9/28* (2006.01)

(52) U.S. Cl. ........................................ 343/735; 343/808
(58) Field of Classification Search ................. 343/735, 343/808, 700 MS
See application file for complete search history.

(56) References Cited

U.S. PATENT DOCUMENTS

| 1,927,522 | A |   | 9/1933  | Lindenblad |
|-----------|---|---|---------|------------|
| 2,227,088 | A | * | 12/1940 | Hollmann ................ 342/415 |
| 2,710,916 | A | * | 6/1955  | Jones et al. ............... 343/808 |
| 2,834,015 | A |   | 5/1958  | Carpenter |
| 3,099,836 | A |   | 7/1963  | Carr et al. |
| 5,959,591 | A |   | 9/1999  | Aurand et al. |
| 6,028,564 | A |   | 2/2000  | Duan et al. |
| 6,097,347 | A |   | 8/2000  | Duan et al. |
| 7,375,699 | B2| * | 5/2008  | Forster et al. ............ 343/806 |
| 2004/0041739 | A1 |   | 3/2004 | Forster et al. |

* cited by examiner

*Primary Examiner*—Hoang V Nguyen (57) ABSTRACT

In an antenna configuration (3) having a first antenna arm (4) and having a second antenna arm (5), the two longitudinal directions (10, 11) of the two antenna arms (4, 5) enclose an acute opening angle ($\alpha$) with one another, wherein the acute opening angle ($\alpha$) has a value of between 15° and 90° and preferably between 25° and 45°.

20 Claims, 8 Drawing Sheets

ANTENNA CONFIGURATION FOR RFID TAGS

This application is a 371 of PCT/IB05/50764 dated Mar. 2, 2005.

FIELD OF THE INVENTION

The invention relates to an antenna configuration which has a first antenna arm and a second antenna arm, wherein each of the two antenna arms is made of electrically conductive material and has a first end and a second end and has a longitudinal direction which runs from the first end to the second end, and wherein the two first ends are arranged at a first distance from one another and adjacent to one another and are in each case intended and designed for electrically conductive connection to a terminal of a signal sink or of a signal source, and wherein the two second ends are arranged at a second distance from one another and remote from one another, said second distance being greater than the first distance.

The invention furthermore relates to a data carrier for contactless communication with a communication station, which data carrier is provided with an antenna configuration for contactless communication.

BACKGROUND OF THE INVENTION

Such an antenna configuration of the type mentioned in the first paragraph is known for example from patent document U.S. Pat. No. 6,028,564 A. In the known antenna configuration—as can be seen for example from FIG. 4 of the patent document U.S. Pat. No. 6,028,564 A—the design is such that the two antenna arms are designed and arranged to be rectilinear and aligned in their longitudinal direction. On account of the design of the known antenna configuration, in order to obtain satisfactory antenna properties it is necessary to configure the antenna arms with a great length, and consequently the antenna configuration as a whole has a great overall length, which in various known applications is more than 20 cm. However, such a great overall length results in undesirable restrictions since a product in which the known antenna configuration is used must have an overall length, which is greater than the overall length of the antenna configuration. This is even the case in the application of the known antenna configuration which is known from the abovementioned patent document, namely during use in so-called tags and labels, so that these tags and labels have a great overall length. This means that the tags and labels can be applied to articles, goods and other products, in a simple manner and in a manner necessary for simple communication operation, only if the relevant article or the relevant goods or the relevant product has a sufficiently long receiving area. However, there is an increasing desire to use such tags and labels also with articles and goods and other products, which have only relatively small dimensions. In such cases, the antenna configuration known from the abovementioned patent document cannot be used since this known antenna configuration has too great an overall length.

In order to reduce the overall length of a known antenna configuration as described above, it has already been proposed to give the two antenna arms of such an antenna configuration a meandering course. Although this means that an antenna configuration with a smaller overall length is obtained, unfortunately the meandering design results in a disadvantage since with such a meandering form so-called parallel capacitances are formed during operation between the sections of the antenna arms which run parallel to one another, and these parallel capacitances reduce the efficiency and thereby disadvantageously result in a smaller communication range.

In connection with a known antenna configuration as mentioned above, reference may also be made to the patent document U.S. Pat. No. 6,097,347 A.

OBJECT AND SUMMARY OF THE INVENTION

It is an object of the invention to avoid the abovementioned difficulties and to produce an improved antenna configuration.

In order to achieve the abovementioned object, features according to the invention are provided in an antenna configuration according to the invention so that an antenna configuration according to the invention can be characterized as follows, namely:

An antenna configuration which has a first antenna arm and a second antenna arm, wherein each of the two antenna arms is made of electrically conductive material and has a first end and a second end and has a longitudinal direction which runs from the first end to the second end, and wherein the two first ends are arranged at a first distance from one another and adjacent to one another and are in each case intended and designed for electrically conductive connection to a terminal of a signal sink or of a signal source, and wherein the two second ends are arranged at a second distance from one another and remote from one another, said second distance being greater than the first distance, and wherein the two longitudinal directions of the two antenna arms enclose an acute opening angle with one another, and wherein the acute opening angle has a value of between 15° and 90°.

By providing the features according to the invention, an improved antenna configuration is achieved in a simple manner and without additional means compared to the known designs, the term "improved" being employed since, as a consequence of the design according to the invention, an antenna configuration according to the invention can be designed to be considerably smaller in terms of its overall length compared to the designs known to date. Admittedly, an antenna configuration according to the invention has a greater overall width compared to the antenna configurations known to date, said overall width running perpendicular to the overall length, but a greater overall width is insignificant and unimportant in the majority of applications.

In an antenna configuration according to the invention, the acute opening angle between the longitudinal directions of the two antenna arms may have various values, for example 15°, 20°, 60°, 70°, 80° and 90°. The choice of angle values depends on a large number of parameters, which have to be defined or acknowledged depending on the desired application, and then—possibly after a number of test series have been carried out—a most suitable opening angle can be selected. It has proven to be very advantageous if said acute opening angle lies within an angle range of between 25° and 45°. In experiments, which have been carried out within the context of developing an antenna configuration according to the invention, it has been found that the abovementioned angle range ensures satisfactory results in a very large number of applications.

In the aforementioned experiments, it has been found to be particularly advantageous if said acute opening angle has a value of 30°±10%. This value has proven to be very advantageous in particular with regard to an application of an antenna configuration in the field of so-called "Radio Frequency Identification" (RFID).

In an antenna configuration according to the invention, the two antenna arms may be designed to run in a curved manner. However, it has proven to be particularly advantageous if the antenna arms are designed to run in a straight line. This is advantageous with regard to a design that is as simple to construct as possible.

However, in an antenna configuration according to the invention, it has also proven to be advantageous if the antenna arms are designed to run in a meandering manner. Although this results in a reduction in efficiency and consequently in the range—as already mentioned above in connection with the known antenna configuration—it does allow the production of a particularly small antenna configuration in terms of surface area.

It should be mentioned at this point that the two antenna arms of an antenna configuration according to the invention might also be designed to run in a wavy manner. It should furthermore be mentioned that the two antenna arms of an antenna configuration according to the invention need not necessarily take the same course but rather may also be designed to run in different manners.

In an antenna configuration according to the invention, it has also proven to be very advantageous if at least one coupling web is provided between the two antenna arms, which coupling web is made of electrically conductive material and extends at least over a region lying between the two antenna arms and is electrically isolated from the two antenna arms. The provision of such a coupling web brings the advantage that it is possible to influence and define the antenna impedance of the antenna configuration in a simple manner.

In an antenna configuration having at least one coupling web, the coupling web may be arranged to run parallel to the angle half-line of the angle between the longitudinal directions of the two antenna arms. However, it is advantageous if the at least one coupling web is arranged to run transversely to the angle half-line of the acute opening angle between the longitudinal directions of the two antenna arms. It is particularly advantageous if the at least one coupling web is arranged to run perpendicular to the angle half-line. Essentially the same influences on the antenna arms are thereby achieved on both sides of the at least one coupling web.

In an antenna configuration according to the invention, it has furthermore proven to be very advantageous if a number of coupling webs are provided, which coupling webs have increasing lengths as the distance from the first ends of the antenna arms increases. In this way, a particularly great influence on the antenna arms and consequently on the antenna impedance of an antenna configuration according to the invention is achieved.

It is furthermore advantageous if the at least one coupling web is designed to run in a straight line, particularly if the two antenna arms are also designed to run in a straight line.

In the case of a coupling web designed to run in a straight line, it has furthermore proven to be advantageous if the at least one coupling web has the form of a narrow strip. This is advantageous in particular when a number of coupling webs are provided.

However, it has also proven to be advantageous if the at least one coupling web has the form of a wide plate. In this case, the width of the plate compared to the abovementioned narrow strip is a multiple of the width of this narrow strip, for example 10 times or 20 times the width thereof. Such a wide plate may have the form of a rectangle or else the form of a trapezium. It should be mentioned that a coupling element having a rectangular external shape with a relatively large width might also be designed in the form of a frame, with a clearance then being provided in the interior of the coupling element. Such a plate-shaped coupling element, which is wide in comparison to a narrow strip, offers the advantage that greater electromagnetic coupling can be achieved with such a plate-shaped coupling element.

In an antenna configuration according to the invention, the at least one coupling web may extend only over a region lying between the two antenna arms. It has proven to be very advantageous if the at least one coupling web extends over the region lying between the two antenna arms and beyond the two antenna arms. In this case, the at least one coupling web is embedded for example in a substrate material for the two antenna arms or the at least one coupling web is provided on a side surface of the substrate for the two antenna arms which lies opposite the side surface on which the two antenna arms are provided. By virtue of the design of the at least one coupling element which extends beyond the antenna arms, particularly good electromagnetic coupling between the two antenna arms is achieved.

In an antenna configuration according to the invention, the two antenna arms, with respect to a substrate for the two antenna arms, may be provided on the same side surface of the substrate. However, it has been found to be particularly advantageous if the two antenna arms, with respect to a substrate for the two antenna arms, are provided on opposite side surfaces of the substrate. As a result, greater electromagnetic coupling between the two antenna arms is achieved, namely on account of the effect of the effective dielectric constant given by the substrate or substrate material.

In an antenna configuration according to the invention, it has furthermore proven to be advantageous if the two antenna arms, with respect to a substrate for the two antenna arms, are provided together on a first side surface of the substrate, and if the at least one coupling web is provided on the opposite, second side surface of the substrate. In this connection, too, the effective dielectric constant of the substrate material has an advantageous effect with regard to achieving as great an electromagnetic coupling as possible between the two antenna arms of the antenna configuration.

In an antenna configuration according to the invention, it has proven to be particularly advantageous if the antenna configuration is intended and designed for use in a contactless data carrier for contactless communication with a communication station, which data carrier contains an IC and the antenna configuration. This is particularly advantageous because the use of an antenna configuration according to the invention in a data carrier designed for contactless communication has proven to be particularly useful and efficient and advantageous.

In order to achieve the object mentioned above, a data carrier for contactless communication with a communication station intended for this purpose is provided with an antenna configuration according to the invention. With such a data carrier, advantages are achieved which correspond to the advantages described above.

The abovementioned aspects and further aspects of the invention emerge from the examples of embodiments described below and are explained with reference to these examples of embodiments.

The invention will be further described with reference to examples of embodiments shown in the drawings to which, however, the invention is not restricted.

DESCRIPTION OF EMBODIMENTS

Figure 1:
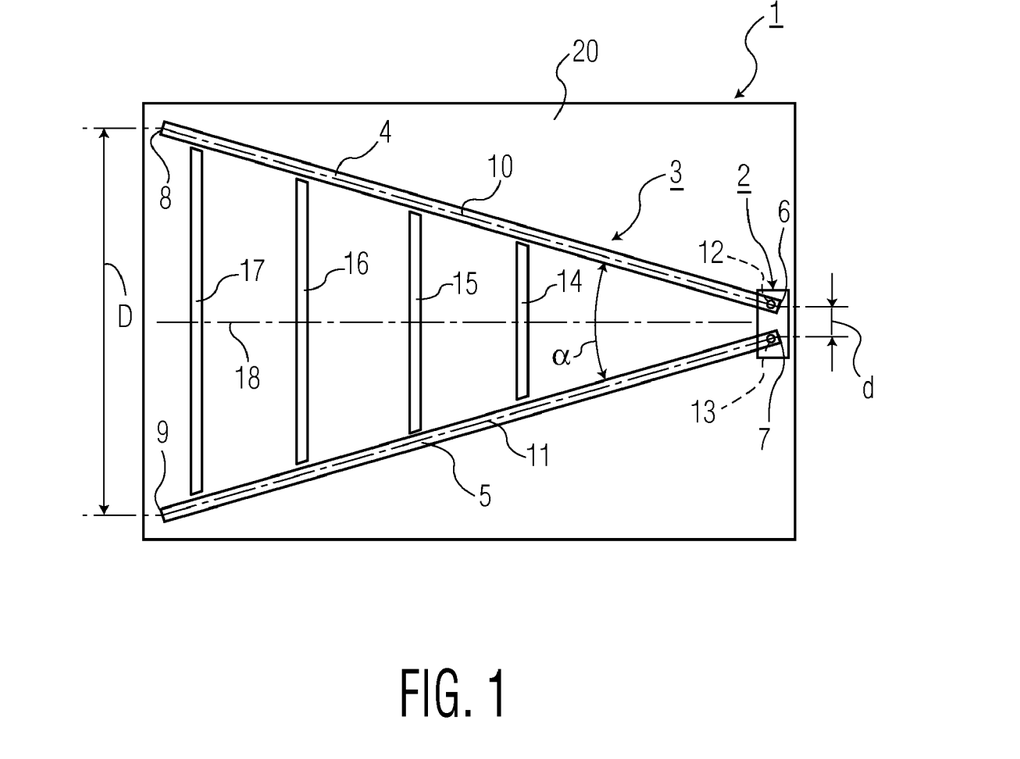
FIG. 1 schematically shows a data carrier according to one example of embodiment of the invention with an antenna configuration according to one example of embodiment of the invention.

FIG. 1 shows a data carrier, which in this case is a label, usually referred to as a tag. The tag 1 shown in FIG. 1 has a substrate 20, which in the present case is made of a film-like plastic material with electrically insulating properties. The substrate 20 may however also be made of paper or board or a base material for a printed circuit board. The tag 1 furthermore has an IC (integrated circuit) 2 and an antenna configuration 3 which is connected to the IC 2 in an electrically conductive manner.

The IC 2 is designed as a so-called transponder IC which has a data memory and data processing means which cooperate with said data memory, the transponder IC being provided to receive and transmit data, which data identify specific articles, goods and other products. The antenna configuration 3 is provided in order to be able to transmit the abovementioned data to the IC 2 and from the IC 2 in a contactless manner, which antenna configuration 3 is designed for contactless cooperation with a station antenna of a communication station.

The antenna configuration 3 has a first antenna arm 4 and a second antenna arm 5. Each of the two antenna arms 4 and 5 is designed to run in a straight line and is made of electrically conductive material. In the present case, the two antenna arms 4 and 5 consist of copper tracks, wherein the copper tracks have been applied to the substrate 20 by means of a printing process. The antenna arms 4 and 5 formed by copper tracks may however also be applied using other known techniques, for example by etching. Each of the two antenna arms 4 and 5 has a first end 6 and 7 and a second end 8 and 9. Furthermore, each antenna arm 4 and 5 has a longitudinal direction, 10 and 11 which runs from the first end 6 and 7 to the second end 8 and 9, which longitudinal direction is shown in each case by a dash-dotted line in FIG. 1.

As can be seen from FIG. 1, the two first ends 6 and 7 are arranged at a first distance d from one another and adjacent to one another. The two first ends 6 and 7 are in this case intended and designed in such a way that the two first ends 6 and 7 are each connected to an IC terminal 12 and 13, respectively. In relation to the antenna configuration 3, the IC 2 forms a signal sink in a reception mode and a signal source in a transmission mode. The two second ends 8 and 9 of the two antenna arms 4 and 5 are arranged at a second distance D from one another and remote from one another, because the second distance D is significantly greater than the first distance d.

In the antenna configuration 3 shown in FIG. 1, it is provided in a particularly advantageous manner that the two longitudinal directions 10 and 11 of the two antenna arms 4 and 5 enclose an acute opening angle $\alpha$ with one another. In the design of the antenna configuration 3 of the tag 1 shown in FIG. 1, the acute opening angle $\alpha$ has a value of approximately 32°.

In the antenna configuration 3 of the tag 1 shown in FIG. 1, four coupling webs 14, 15, 16 and 17 are provided between the two antenna arms 4 and 5. The four coupling webs 14, 15, 16, 17 are made of electrically conductive material in the same way as the antenna arms 4 and 5. In the present case, the four coupling webs 14, 15, 16, 17 likewise consist of copper tracks, which were applied to the substrate 20 at the same time as the two antenna arms 4 and 5 by means of a printing process. The four coupling webs 14, 15, 16, 17 are arranged to run transversely to the angle half-line 18 of the angle $\alpha$ between the two longitudinal directions 10 and 11 of the two antenna arms 4 and 5, and are electrically isolated from the two antenna arms 4 and 5. This electrical isolation is achieved in a simple manner in that the four coupling webs 14, 15, 16, 17 lie with each of their two ends in each case at a distance from the two antenna arms 4 and 5, so that the electrical isolation between the two antenna arms 4 and 5 and the four coupling webs 14, 15, 16 17 is ensured by means of the electrically insulating substrate 20. In the present case, the four coupling webs 14, 15, 16, 17, which run transversely to the angle half-line 18, are arranged to run perpendicular to the angle half-line 18. The four coupling webs 14, 15, 16, 17 may however also be arranged to run at an angle other than 90° in relation to the angle half-line 18. The four coupling webs 14, 15, 16, 17 have increasing lengths as the distance from the first ends 6 and 7 of the two antenna arms 4 and 5 increases, as can be seen from FIG. 1.

The tag 1 shown in FIG. 1 and the antenna configuration 3 provided in the tag 1 represent only one variant embodiment of many possible variant embodiments. Further details regarding other variant embodiments and regarding the knowledge and design possibilities for implementing other variant embodiments will be given below.

The present invention relates to a novel antenna configuration, which is particularly suitable for use in the field of "Radio Frequency Identification" (RFID) in the HF range above 800 MHz. One particular advantage of the novel design of an antenna configuration is the reduction in the maximum size of the antenna configuration and the simple matching of the antenna impedance of the antenna configuration to a predefined source impedance.

The novel antenna configuration may be used in various fields of wireless data communication, for example in the field of telecommunication and so-called Bluetooth communication and so-called NFC communication, to which the standard ISO 18092 relates. One particularly suitable field of application is provided by automatic identification systems, which are increasingly being used in particular in the service sector and in procurement and distribution logistics and also in the commercial sector and in production works.

In particular, contactless identification systems, for example the so-called transponder systems, are used to exchange data quickly and without any cable connections, which may sometimes get in the way. In systems, which operate below about 800 MHz, contactless communication is based on an inductive coupling of transmission coils, which together with at least one capacitor form a resonant circuit, which means that these are suitable only for small distances of around a few centimeters. On account of physical boundary conditions, transponder systems, which operate above around 800 MHz, are particularly suitable for data exchange over a range of a few meters. In this context, active transponders (these contain a separate power supply source, for example a battery) and passive transponders (their power supply comes from an electrical rectifier circuit which rectifies a contactlessly received HF signal) and semi-passive transponders (in which, after a wake-up operation has been carried out in a contactless manner, a battery for example is activated for the power supply) are known. The transponder contains a semiconductor chip (IC) which stores all the data and is often programmable and rewritable, and also an associated antenna configuration (high-frequency antenna) which is tuned to the appropriate frequency band, for example in the USA to the UHF band: 902 MHz to 928 MHz or in Europe to the band: 863 MHz to 868 MHz or to the known ISM bands: for example the band: 2.4 GHz to 2.83 GHz.

In order to ensure as high an efficiency of such a transponder as possible, an efficient antenna configuration must be provided and it must furthermore be ensured that the reflection between the antenna configuration and the IC is as low as possible. The latter is achieved by ensuring performance matching between the two components. The maximum performance is achieved if the chip impedance is complexly conjugated to the antenna impedance.

$$\underline{Z}_{chip} = \underline{Z}^*_{antenna}$$

$$R_{chip} + j \cdot X_{chip} = R_{antenna} - j \cdot X_{antenna}$$

This means that the values of the real parts and of the imaginary parts of the complex impedances should be as equal as possible, with the reactances additionally being conjugated to one another.

On account of the process, the impedance of the IC is usually capacitive, so that the imaginary part ($X_{chip}$) is negative. This means that, for good transmission, an antenna configuration must have an inductive behavior. The reactance ($X_{antenna}$) must therefore be positive and in terms of the value must be equal to the value of the imaginary part of the chip impedance. If the reactance meets this condition, and furthermore provided that the two real parts ($R_{chip}$ and $R_{antenna}$) are likewise equal, performance matching is achieved and a maximum transfer of power between the IC and the antenna configuration is ensured. For an efficient antenna design, the real part and the imaginary part of the antenna configuration must therefore be matched to a given chip impedance.

A method of matching the antenna impedance is known from the two patent documents cited above. This method is based on the use of conventional dipole antennas in combination with so-called "tuning stubs" for modifying the imaginary part and "loading bars" for matching the real part of the antenna configuration.

According to the present invention, an antenna configuration is produced in which it is possible to adjust the antenna impedance without additional known "tuning stubs" and "loading bars" being necessary for this purpose.

An antenna configuration according to the invention consists of a conductive metallization (for example Cu, Au, Ag, Al or suitable alloys or a superconductive material), which metallization is applied to a substrate material (plastics, ceramics, plastics with embedded ceramic particles) having a dielectric constant $\in_r \geq 1$ and/or a permeability constant $\mu_r \geq 1$, or is embedded in this substrate material by means of known multilayer techniques. The metallization may be structured by conventional methods such as etching, milling, screen-printing or stamping or bonding, and applied to the substrate.

The invention is based on exploiting the inductive behavior of a simple piece of conductor track or wire. This inductive behavior is particularly necessary since the impedance of an IC of a transponder usually has a capacitive behavior, which is thus complexly conjugated to the impedance of the conductor track. In order to modify the inductance of the piece of conductor track, specific boundary conditions (for example length, cross section, substrate properties) may be changed. However, a further possibility consists in changing the coupling to a second piece of conductor track, which lies in the direct vicinity of the first piece of conductor track. The function of such a coupling is described in more detail below. From here on, instead of the term "antenna configuration" used up to now, the term "antenna" is used for short.

Figure 2A:
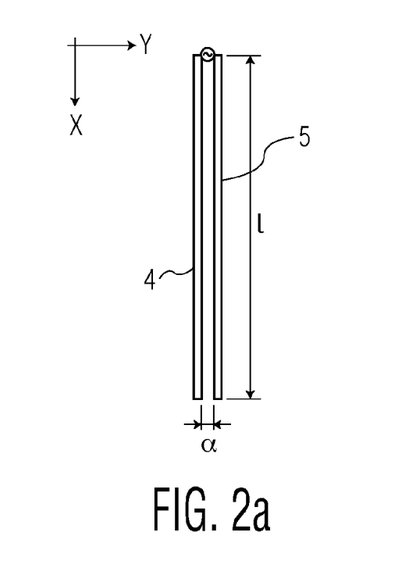
FIG. 2a shows conductor tracks arranged parallel to one another in accordance with the invention.
Figure 2B:
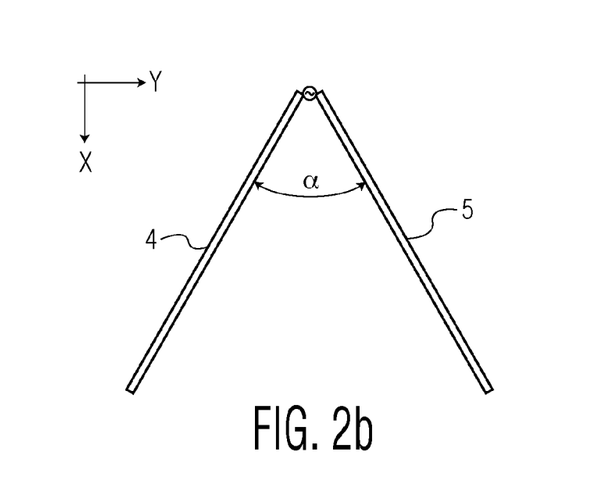
FIG. 2b shows conductor tracks arranged at an acute angle in accordance with the invention.
Figure 2C:
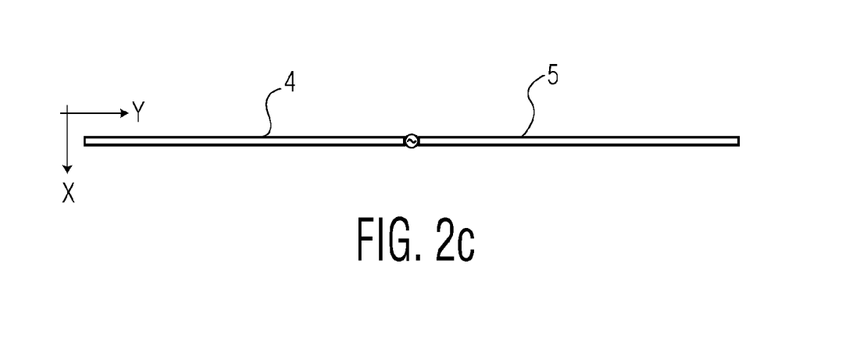
FIG. 2c shows conductor tracks arranged in a straight line in accordance with the invention.

FIGS. 2a-c show the antenna principle used according to the invention and the corresponding physical design. Starting from two conductor tracks 4 and 5 (antenna arms) arranged to run parallel, which each have the length l and are applied to a substrate material—as shown in FIG. 2a, by moving the two conductor tracks 4 and 5 apart so that they enclose an opening angle, specifically an acute angle as shown in FIG. 2b, the input impedance of the resulting antenna can be modified and within a wide range matched to a given source impedance, so that the impedance of the antenna is ideally complexly conjugated to the source impedance and thus a maximum transfer of power between antenna and source is ensured. The IC 2 (see FIG. 1) is provided as source or sink, which IC 2 is contacted between the two first ends 6 and 7 (see FIG. 1) of the conductor tracks. If the two conductor tracks 4 and 5, which originally run parallel to one another, are rotated in opposite directions by in each case $\alpha=90°$, an opening angle of 180° is achieved and a conventional dipole is produced (FIG. 2c).

Since an antenna is a resonant component, the length l of an antenna arm 4 and 5 can be approximately calculated as follows:

$$l \approx \frac{c}{4 \cdot \sqrt{\varepsilon_r} \cdot f}$$

where:
c=velocity of light in vacuum,
$\in_r$=dielectric constant of the substrate (FR4≈4.4) and
f=frequency.

Since coupling mechanisms between the metallic structures influence the effective length of the antenna, the respective design should be optimized and adapted by appropriate experiments and/or simulations. In particular, in the antenna design according to the invention, the length of the two antenna arms 4 and 5 must be increased in order to shift the resonant frequency into the desired frequency range (UHF or ISM range).

Neither the parallel conductor tracks 4 and 5 in FIG. 2a nor the aligned conductor tracks 4 and 5 (180° dipole) in FIG. 2c are suitable for use in the required application. In the first solution, hardly any power is transmitted since this is short-circuited by a strong capacitive coupling between the two conductor tracks 4 and 5 in FIG. 2a. In the second solution, although this is a very effective transmitter, it cannot be used in the required application without further modification since the complex antenna input impedance is too different from a required conjugated complex chip impedance.

Figure 3:
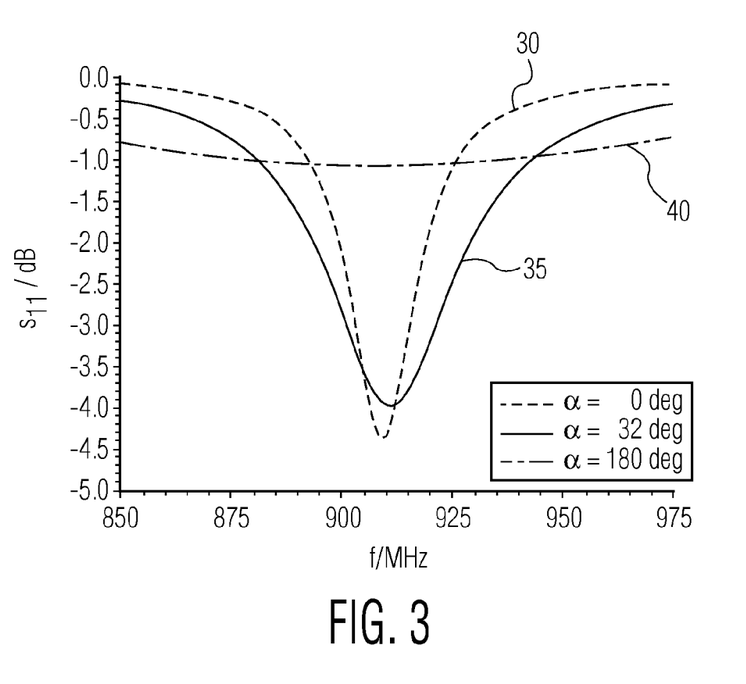
FIG. 3 shows the scattering parameter $s_{11}$ for the three antennas shown in FIGS. 2a-c, respectively.

In order to illustrate this, FIG. 3 shows the scattering parameter $s_{11}$ for the three antennas shown in FIGS. 2a-c, respectively. The scattering parameter $s_{11}$ is not based on a resistance of 50Ω—as is customary in HF technology—but rather on a complex impedance of $\underline{Z}_{ant}=(R+j\ X)\Omega$. This results from a complex chip impedance of the transponder chip of $\underline{Z}_{chip}=(R-j\ X)\Omega$ and thus means that the impedances of antenna and semiconductor chip should be matched to one another such that performance matching is achieved ($\underline{Z}_{ant}=\underline{Z}_{chip}^*$).

As can be seen from FIG. 3, when the conductor tracks 4 and 5 are parallel shown by curve 30, a resonance in the required frequency range (in this case 902 to 928 MHz) is produced. However, the extremely low efficiency of the antenna of less than 1% does not permit use in an RFID application. The curve 35 shown in unbroken line shows the matching in the case where the two conductor tracks 4 and 5 enclose an opening angle α≅32° with one another. Fortunately, this design exhibits a larger resonant bandwidth than the parallel course of the conductor tracks 4 and 5 and also a considerably increased total efficiency ($\eta_{tot}$) of 48.5%. If the reflection is not taken into account, the radiation efficiency ($\eta_{rad}$) of the antenna increases to a value of 72.2%, in accordance with the equation:

$$\eta_{rad} = \frac{\eta_{tot}}{1-|s_{11}|^2}$$

If the opening angle α is further increased to 180°, the matching according to the curve 40 shown in dash-dotted line in FIG. 3 is produced for the dipole. The poor matching to the necessary chip impedance once again in this case does not allow use in the required application without further modifications or leads to a considerable impairment of the transmission properties. On account of the poor matching, the high radiation efficiency is reduced from $\eta_{rad}$=98.6% to the efficiency of $\eta_{tot}$=21.8% actually available during use.

Besides the improved impedance matching (and an increased impedance bandwidth), the antenna designed according to the invention moreover has the advantage that the length of the antenna is reduced to half the length of conventional dipole structures, with only a slightly increased width of the antenna having to be taken into account.

As already mentioned, besides the required operating frequency, the impedance of the antenna is also of great importance because the efficiency of the transponder can be maximized by suitably adjusting the real part and the imaginary part. In the antenna according to the invention, the desired impedance is achieved by modifying the antenna design itself. Here, the strength of the coupling between the two conductor tracks 4 and 5 (antenna arms) is of critical importance. The coupling depends on the opening angle α between the two conductor tracks (metallizations) 4 and 5 and to a limited extent also on the substrate 20 (see FIG. 1) used.

Figure 4:
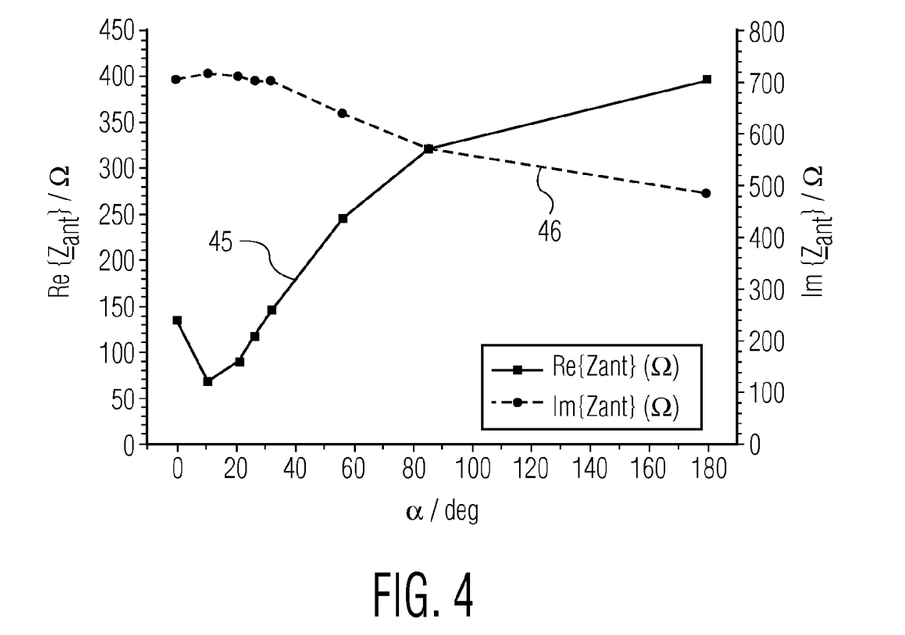
FIG. 4 shows the variation in the complex antenna impedance (divided into real part and imaginary part) as a function of the opening angle $\alpha$.

The variation in the complex antenna impedance (divided into real part and imaginary part) as a function of the opening angle α is shown in FIG. 4.

Figure 5:
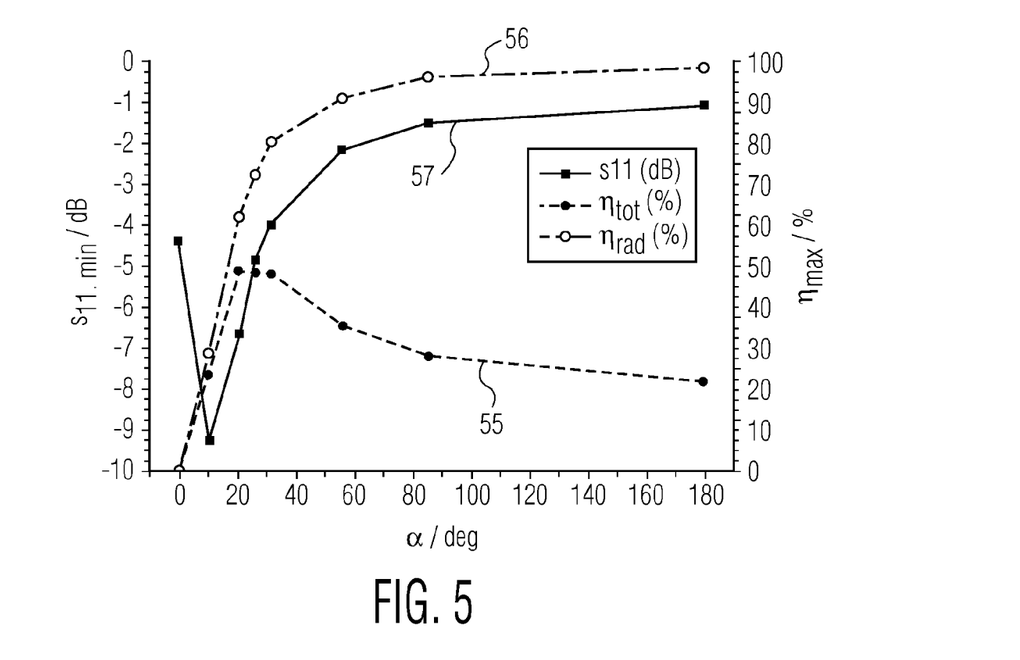
FIG. 5 shows scattering parameter $s_{11}$ and efficiencies of an antenna as a function of the opening angle $\alpha$.

The high dependency of the real part 45 and imaginary part 46 of the complex antenna impedance as a function of the opening angle α can be clearly seen. Unlike the imaginary part 46, which decreases as the opening angle α increases, the real part 45 increases as the angle α increases. If only the matching to the necessary complex impedance is taken as a criterion for the optimal opening angle α, this criterion would be met in the case of a small opening angle α. In this case, the reflection is essentially caused by the real part 45. It has been found that the efficiency of the antenna is also a function of the opening angle α, and that the greatest possible efficiency does not necessarily occur with the best matching. Therefore, FIG. 5 shows a comparison between the minimum reflection 57 and the maximum efficiency (radiation efficiency 56 and total efficiency 55) as a function of the opening angle α. The connection (which is already known) between matching and reflection can once again clearly be seen. The best matching is achieved at α≈10° ($s_{11}$=-9.3 dB). However, at this opening angle α, the efficiency 55 ($\eta_{tot}$) of the antenna is only around 23.5% ($\eta_{rad}$≈28.6%). The increase in the radiation efficiency 56 to more than 98% can clearly be seen if the opening angle α is increased to 180° (dipole). However, on account of the reflection, the efficiency 55 ($\eta_{tot}$) available during use falls drastically in the case of large opening angles α. A maximum of $\eta_{tot}$ can be found at an opening angle α of around 20°-30°. In this case, the opening angle α of around 21° would be selected since relatively good impedance matching ($s_{11}$ around -6.7 dB) is obtained here and thus few reflections arise between the antenna and the semiconductor chip. The efficiency 55 ($\eta_{tot}$) is in this case approximately 49%.

As can be seen from what has been stated above, the antenna impedance can be modified within wide ranges by a suitable opening angle α. Moreover, in the text which follows, additional design modifications will be described which can likewise be used with advantage to match the antenna impedance to a given chip impedance.

Figure 6:
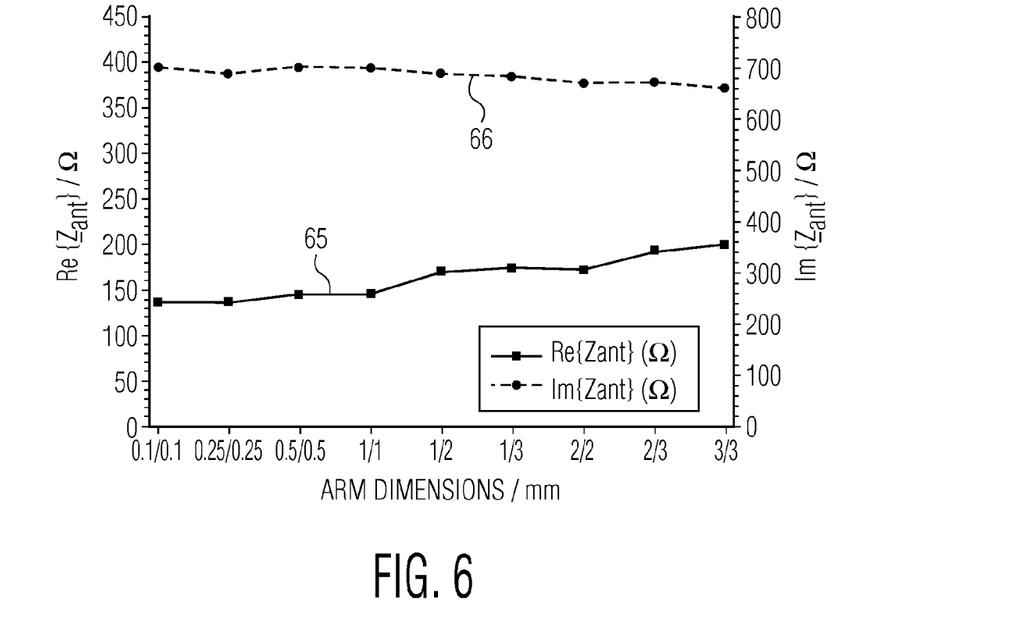
FIG. 6 shows real and imaginary part of the complex antenna impedance as a function of the width of the antenna arms.

The widths of the two longitudinal conductor tracks (antenna arms) 4 and 5 (see FIG. 1) of the antenna are suitable for this purpose. FIG. 6 shows in this respect the real part 65 and the imaginary part 66 of the complex antenna impedance as a function of various widths of the two antenna arms 4 and 5, said widths being selected by way of example. The data on the ordinate show the respective width of the first antenna arm 4 (the number given to the left of the oblique) and of the second antenna arm 5 (the number given to the right of the oblique). An increase in the real part 65 as a function of the width of the antenna arms 4 and 5 can clearly be seen. By contrast, there is a simultaneous decrease in the imaginary part 66 of the antenna impedance. This means that, by suitably selecting the width of the antenna arms 4 and 5, the complex impedance of the antenna can likewise be influenced and can be matched to a required chip impedance.

Figure 7:
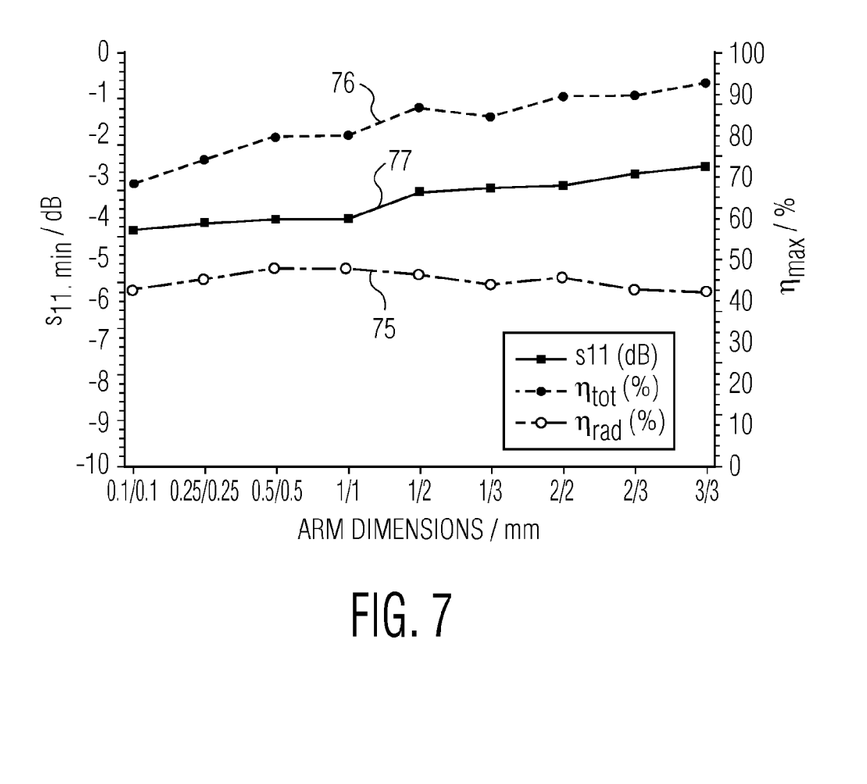
FIG. 7 shows scattering parameter $s_{11}$ and efficiencies of the antenna as a function of the width of the antenna arms.

FIG. 7 furthermore shows the connection between the scattering parameter 77 ($s_{11}$) and the efficiencies 75 and 76 ($\eta_{tot}$, $\eta_{rad}$) once again as a function of the width of the antenna arms. On account of the variation in particular in the real part of the antenna impedance, the matching to the required chip impedance is reduced slightly. At the same time, however, the total efficiency of the antenna also increases. An optimal antenna performance (compromise between impedance matching and efficiency) can be seen at a width of the antenna arms of in each case 0.5 mm to 1.0 mm.

Besides the additional modification to the antenna impedance mentioned above, a further design modification may also be used in order to achieve desired impedance matching. This is achieved by varying the capacitive coupling between the two conductor tracks (antenna arms) 4 and 5. This coupling can be strengthened by providing coupling webs 85 between the two antenna arms 4 and 5, which coupling webs are formed by "floating" conductor track structures which are made of metal and have no conductive contact to the antenna arms 4 and 5, as can be seen from FIG. 8. These coupling webs 85 may be located on the same side of the substrate 20 (see FIG. 1) as the antenna arms themselves (upper side of the substrate 20) or on the opposite side (underside of the substrate 20) or else in a layer between the upper side and the underside of the substrate 20, that is to say embedded in the substrate 20, and this latter case is particularly advantageous in the case of multilayer substrates. It should also be mentioned that the two antenna arms 4 and 5 may also be provided on different sides of the substrate 20, namely the upper side of the substrate 20 and the underside of the substrate 20.

Figure 8:
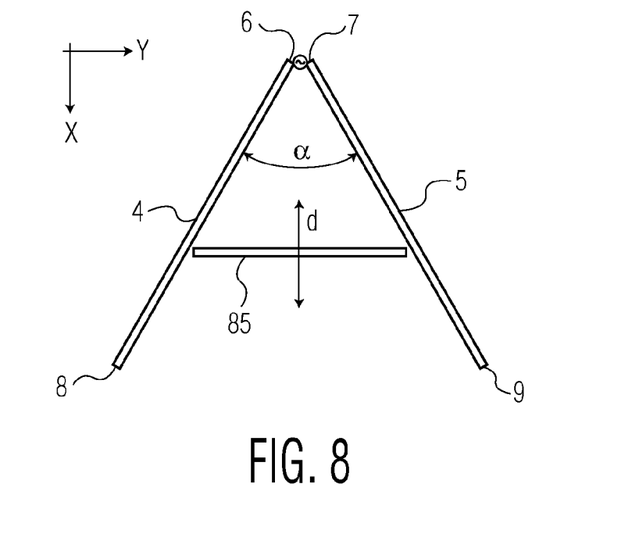
FIG. 8 shows antenna with a single capacitive coupling web.
Figure 9:
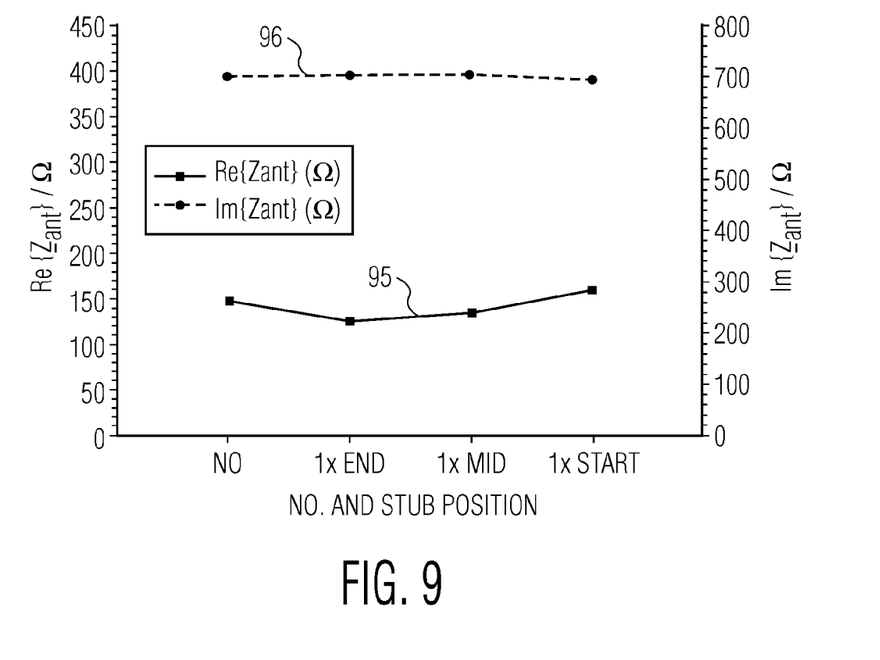
FIG. 9 shows the real part and imaginary part of the complex antenna impedance as a function of the position of a capacitive coupling element.

FIG. 9 shows the real part 95 and the imaginary part 96 of the complex antenna impedance as a function of the position of the capacitive coupling element 85 (see FIG. 8). In this case, only one coupling element 85 is provided, which is formed by a 1 mm-wide rectangular metallic strip which is arranged between the two antenna arms 4 and 5. For test purposes and measurement purposes, the position of such a coupling element 85 has been changed from a position at the first ends 6 and 7 of the two antenna arms (1× end), which first ends lie close to one another, via a middle position (1× mid) to a position at the second ends 8 and 9 of the two antenna arms (1× start), which second ends 8 and 9 are remote from one another. In this case, coupling elements 85 of varying length were used so that each coupling element 85 was at a distance of 0.01 to 1.0 mm from the two antenna arms 4 and 5. The corresponding complex antenna impedances are shown in FIG. 9 in comparison with the characteristic without the use of a corresponding coupling element (no). As can be seen, the imaginary part 96 is only weakly influenced but the real part 95 is influenced to a greater extent.

Figure 10:
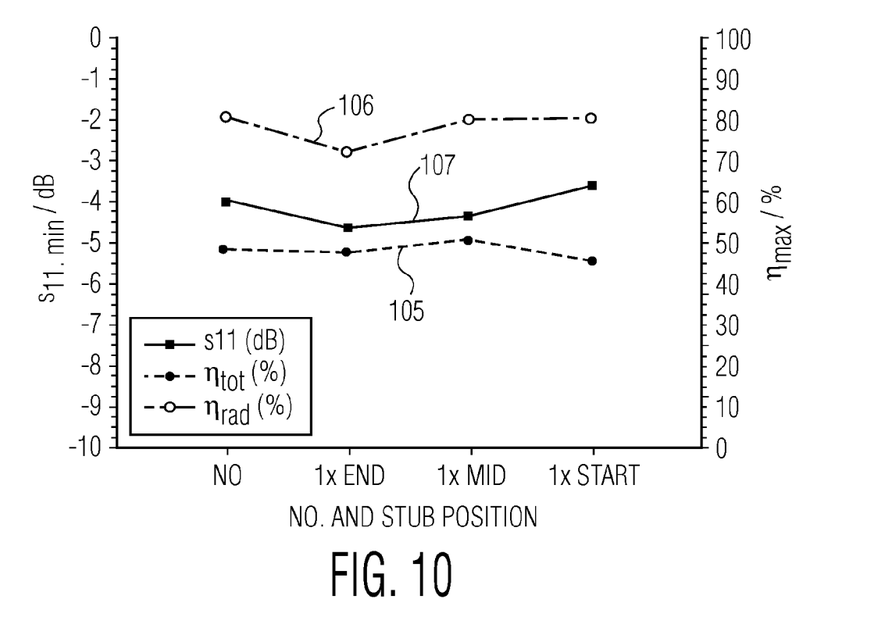
FIG. 10 shows the scattering parameter $s_{11}$ and the corresponding efficiencies ($\eta_{tot}$ and $\eta_{rad}$) as a function of position.

FIG. 10 once again shows the scattering parameter 107 ($s_{11}$) and the corresponding efficiencies 105 and 106 ($\eta_{tot}$ and $\eta_{rad}$). In this case, a maximum total efficiency can be seen when using a coupling element in the middle.

Figure 11:
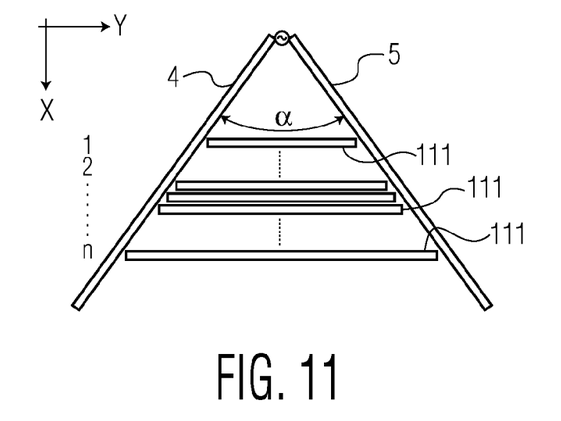
FIG. 11 shows a number of coupling elements by way of example in a middle position.

Based on the knowledge explained above, the effects of providing a number of coupling elements will be discussed below. FIGS. 11 shows by way of example the arrangement of a number of coupling elements 111 between the two antenna arms 4 and 5. In this case, the coupling elements 111 are each arranged by way of example at a distance of 1.0 mm from one another. Advantageous distances between the coupling elements 111 are between 0.01 mm and 1.0 mm.

Figure 12:
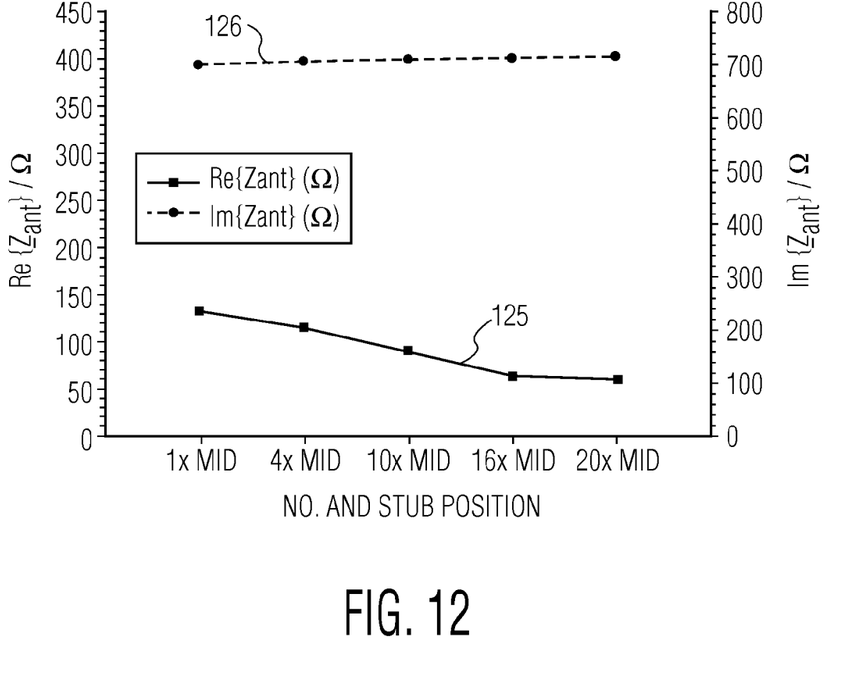
FIG. 12 shows real part and imaginary part of the complex antenna impedance as a function of the number of central capacitive coupling elements which are provided.

FIG. 12 once again shows the complex antenna impedance separated into real part 125 and imaginary part 126 as a function of the number of central coupling elements 111 provided between the two antenna arms 4 and 5. In this case, too, a variation in the imaginary part 126 and to a greater extent in the real part 125 can be seen.

Figure 13:
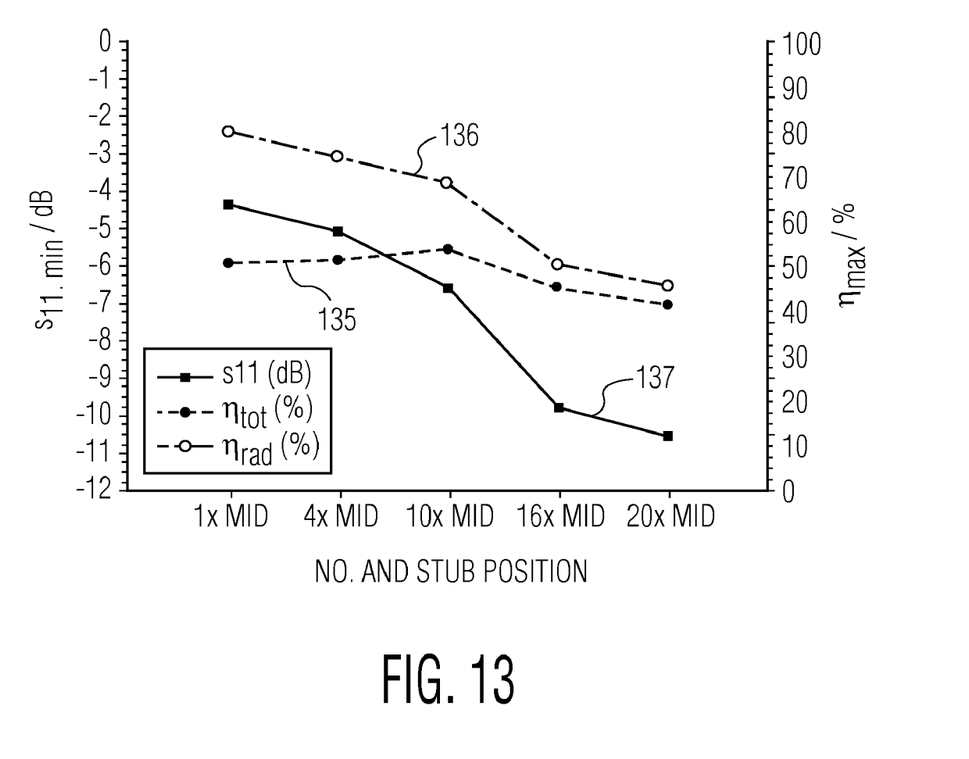
FIG. 13 shows scattering parameter $s_{11}$ and efficiencies of the antenna as a function of the number of central capacitive coupling elements which are provided.

FIGS. 13 once again shows the scattering parameter 137 ($s_{11}$) and the two efficiencies 135 and 136 ($\eta_{tot}$ and $\eta_{rad}$). Here, an improvement in the reflection can be seen as the number of coupling elements increases. At the same time, however, the radiation efficiency 136 ($\eta_{rad}$) of the antenna is reduced, which in turn leads to a reduction in the total efficiency 135 ($\eta_{tot}$). When using ten (10) coupling elements 111, a maximum of this efficiency of $\eta_{tot}$=54% can be seen in the case of an (almost) constant impedance matching of $s_{11}$=approximately −6.6 dB (compared to the initial situation shown in FIGS. 3-4).

Finally, it should once again be pointed out that the present invention provides a novel antenna configuration, which is particularly suitable for use in RFID applications in the HF range above 800 MHz. One particular advantage of the antenna configuration according to the invention lies in the reduction in its overall length to approximately half (50%) of the length of antenna configurations known to date and also in the simple matching of the impedance of the antenna configuration according to the invention to a predefined sink/source impedance. By providing different sizes of opening angle α between the two antenna arms 4 and 5, a different degree of capacitive coupling between the two antenna arms 4 and 5 is made possible, as a result of which it is possible in a simple manner to achieve varying real parts for the antenna impedance of the antenna configuration according to the invention. For the inductive behavior of the antenna configuration, a desired range can be achieved in a simple manner by suitably selecting the length of the two antenna arms 4 and 5. A desired frequency bandwidth of the antenna configuration can be achieved by suitably selecting the width of the two antenna arms 4 and 5. The width of the two antenna arms 4 and 5 can be selected to be different via the length of the antenna arms 4 and 5, wherein said two antenna arms 4 and 5 have a smaller width in the region of their first ends 6 and 7 and a larger width in the region of their second ends 8 and 9, and wherein the width preferably, yet not necessarily, increases linearly.

In an antenna configuration according to the invention comprising two antenna arms 4 and 5 and at least one coupling web 111, the at least one coupling web 111 can also be formed by a triangular coupling plate, wherein the triangular shape of the coupling plate is selected as a function of the acute opening angle α between the two antenna arms 4 and 5 and the relative position of the two antenna arms 4 and 5 with respect to one another which is defined thereby.

The invention claimed is:

1. An antenna configuration which has a first antenna arm and a second antenna arm, wherein each of the two antenna arms is made of electrically conductive material and has a first end and a second end and has a longitudinal direction which runs from the first end to the second end, wherein the two first ends are arranged at a first distance from one another and adjacent to one another and are in each case intended and designed for electrically conductive connection to a terminal of a signal sink or a signal source, wherein the two second ends are arranged at a second distance from one another and remote from one another, said second distance being greater than the first distance, and wherein the two longitudinal directions of the two antenna arms enclose an acute opening angle (a) with one another, and wherein the acute opening angle has a value of between 15° and 90°, wherein at least one coupling web is provided in order to electromagnetically couple the two antenna arms, wherein the coupling web is made of electrically conductive material and extends at least over a region lying between the two antenna arms and is electrically isolated from the two antenna arms, the antenna configuration satisfying at least one of:

(a) wherein the at least one coupling web has the form of a wide plate,
  (b) wherein the at least one coupling web extends over the region lying between the two antenna arms and beyond the two antenna arms, and
  (c) wherein the two antenna arms, with respect to a substrate for the two antenna arms, are provided together on a first side surface of the substrate and wherein the at least one coupling web is provided on the opposite, second side surface of the substrate.

2. An antenna configuration as claimed in claim 1, wherein the acute opening angle has a value of between 25° and 45°.

3. An antenna configuration as claimed in claim 2, wherein the acute opening angle has a value of 30°±10%.

4. An antenna configuration as claimed in claim 1, wherein the two antenna arms are designed to run in a straight line.

5. An antenna configuration as claimed in claim 1, wherein the two antenna arms are designed to run in a meandering manner.

6. An antenna configuration as claimed in claim 1, wherein the at least one coupling web is arranged to run transversely to the angle half-line of the acute opening angle between the longitudinal directions of the two antenna arms.

7. An antenna configuration as claimed in claim 6, wherein the at least one coupling web is arranged to run perpendicular to the angle half-line of the acute opening angle between the longitudinal directions of the two antenna arms.

8. An antenna configuration as claimed in claim 1, wherein a number of coupling webs are provided, which coupling webs have increasing lengths as the distance from the first ends of the two antenna arms increases.

9. An antenna configuration as claimed in claim 1, wherein the at least one coupling web is designed to run in a straight line.

10. An antenna configuration as claimed in claim 1, wherein the at least one coupling web has the form of a narrow strip.

11. An antenna configuration as claimed in claim 1, wherein the two antenna arms, with respect to a substrate for the two antenna arms, are provided on opposite side surfaces of the substrate.

12. An antenna configuration as claimed in claim 1, wherein the antenna configuration is intended and designed for use in a contactless data carrier for contactless communication with a communication station, which data carrier contains an IC and the antenna configuration.

13. A data carrier for contactless communication with a communication station, characterized in that the data carrier is provided with an antenna configuration as claimed in claim 1.

14. An antenna configuration which has a first antenna arm and a second antenna arm, wherein each of the two antenna arms is made of electrically conductive material and has a first end and a second end and has a longitudinal direction which runs from the first end to the second end, wherein the two first ends are arranged at a first distance from one another and adjacent to one another and are in each case intended and designed for electrically conductive connection to a terminal of a signal sink or a signal source, wherein the two second ends are arranged at a second distance from one another and remote from one another, said second distance being greater than the first distance, and wherein the two longitudinal directions of the two antenna arms enclose an acute opening angle with one another, and wherein the acute opening angle has a value of between 15° and 90°, wherein the two antenna arms, with respect to a substrate for the two antenna arms, are provided on opposite side surfaces of the substrate.

15. An antenna configuration as claimed in claim 14, wherein the acute opening angle has a value of between 25° and 45°.

16. An antenna configuration as claimed in claim 15, wherein the acute opening angle has a value of 30°±10%.

17. An antenna configuration as claimed in claim 14, wherein the two antenna arms are designed to run in a straight line.

18. An antenna configuration as claimed in claim 14, wherein the two antenna arms are designed to run in a meandering manner.

19. An antenna configuration which has a first antenna arm and a second antenna arm, wherein each of the two antenna arms is made of electrically conductive material and has a first end and a second end and has a longitudinal direction which runs from the first end to the second end, wherein the two first ends are arranged at a first distance from one another and adjacent to one another and are in each case intended and designed for electrically conductive connection to a terminal of a signal sink or a signal source, wherein the two second ends are arranged at a second distance from one another and remote from one another, said second distance being greater than the first distance, and wherein the two longitudinal directions of the two antenna arms enclose an acute opening angle with one another, and wherein the acute opening angle has a value of 30°±10%.

20. An antenna configuration as claimed in claim 19, wherein the two antenna arms are designed to run in a straight line.

* * * * *